(12) United States Patent
Park

(10) Patent No.: US 7,028,379 B2
(45) Date of Patent: Apr. 18, 2006

(54) HOOD LATCH ASSEMBLING DEVICE OF FRONT END MODULE FOR VEHICLE

(75) Inventor: Jae-Ho Park, Seoul (KR)

(73) Assignee: Halla Climate Control Corporation, Daejon-si (KR)

( * ) Notice: Subject to any disclaimer, the term of this patent is extended or adjusted under 35 U.S.C. 154(b) by 94 days.

(21) Appl. No.: 10/779,772

(22) Filed: Feb. 18, 2004

(65) Prior Publication Data

US 2004/0168290 A1 Sep. 2, 2004

(51) Int. Cl.
*E23P 19/04* (2006.01)

(52) U.S. Cl. .................................................. 29/281.5
(58) Field of Classification Search .............. 29/251, 29/252, 281.1, 281.5; 269/37, 47, 50, 51
See application file for complete search history.

(56) References Cited

U.S. PATENT DOCUMENTS 6,021,554 A * 2/2000 Sandrolini et al. ............ 29/251

* cited by examiner

*Primary Examiner*—Robert C. Watson
(74) *Attorney, Agent, or Firm*—Lowe, Hauptman & Berner, LLP

(57) ABSTRACT

The present invention relates to a hood latch assembling device for assembling a hood latch to a position of a carrier which is the same as a hood latch part of the vehicle. The hood latch assembling device includes: a carrier assembling stand for fixing the carrier; and a hood latch guide jig for exactly positioning the hood latch assembly at a predetermined position of the carrier. The hood latch assembling device can reduce a time period required for an assembling process of the vehicle and lower an defective proportion as a position error rate of the hood latch is reduced by assembling the hood latch to an exact position of a carrier when a front end module is constructed.

9 Claims, 6 Drawing Sheets

HOOD LATCH ASSEMBLING DEVICE OF FRONT END MODULE FOR VEHICLE

BACKGROUND OF THE INVENTION

1. Field of the Invention

The present invention relates to a hood latch assembling device of a front end module for a vehicle, and more particularly, to a device for assembling a hood latch to a position of a carrier which is the same as a hood latch part of the vehicle.

2. Background of the Related Art

In general, a vehicle includes various parts, such as a heat exchanger like a radiator, head lamps, and a bumper assembly, on the front part thereof. Recently, the radiator part, the head lamps, and the bumper assembly mounted on the front part of the vehicle are not installed on the vehicle body individually but installed respectively on a carrier for simplification of assembly and reduction of the number of assembling processes to form a front end module (FEM). The front end module is carried to an automobile assembling factory, and installed on the front body part of the vehicle.

A hood latch is a part serving to fix the front hood of the vehicle, and includes a hood latch assembly fixed to the front carrier of the vehicle and a fixed part of the front hood engaged and fixed with the hood latch assembly.

FIG. 1 shows a hood latch assembly 100 and a carrier 200 on which the hood latch assembly 100 is mounted. The hood latch assembly 100 and the carrier 200 of the hood latch assembling device according to the present invention are almost the same as the prior arts in their structure, and so, will be described referring to the drawing of the present invention.

As shown in FIG. 1, the hood latch assembly 100 includes three fixing holes 101, and a hood receiving part 102 formed in the central portion thereof for fixing the fixed part (not shown) of the hood.

Furthermore, the carrier 200, to which the hood latch assembly 100 is assembled, also has fixing holes 201 corresponding to the fixing holes 101 of the hood latch assembly 100. The hood latch assembly 100 is located at the carrier 200 so that the fixing holes 101 and 201 are located at the corresponding positions with each other, and then, assembled to the carrier 200 by fastening means such as bolts.

The carrier 200 to which the hood latch assembly 100 has been assembled previously is carried to the automobile manufacturing factory to be assembled to the vehicle. At this time, if there is any error in the assembled position of the hood latch assembly 100, the hood of the vehicle may not be fixed due to the hood latch assembly 100.

If the above error occurs, as the assembled front end module or the whole finished vehicle becomes defective, a great deal of costs and time are needed to solve the problems.

SUMMARY OF THE INVENTION

Therefore, the present invention has been made in view of the above problems, and it is an object of the present invention to provide a hood latch assembling device of a front end module for a vehicle, which can reduce a time period required for an assembling process of the vehicle and lower an defective proportion as a position error of the hood latch is reduced by assembling the hood latch to an exact position of a carrier when a front end module is constructed.

To accomplish the above object, according to one aspect of the present invention, there is provided a hood latch assembling device of a front end module for a vehicle including: a carrier assembling stand for fixing the carrier; and a hood latch guide jig for exactly positioning the hood latch assembly at a predetermined location of the carrier, wherein the carrier assembling stand includes: a vertical frame; a horizontal frame; horizontal fixing jigs for fixing and supporting the carrier on the vertical frame in the horizontal direction; and a vertical fixing jig for fixing and supporting the carrier on the horizontal frame in the vertical direction, and wherein the hood latch guide jig is mounted at an end of the horizontal frame of the carrier assembling stand.

It is preferable that the carrier assembling stand further includes a horizontal supporting device for preventing a horizontal movement of the carrier by supporting the rear surface of the carrier during an assembling of the hood latch assembly to the carrier.

It is preferable that the horizontal fixing jigs include: a horizontal position adjusting pin to be inserted into horizontal position adjusting holes formed in the carrier for horizontally fixing the carrier; and a drive unit for moving the horizontal position adjusting pin.

It is preferable that the vertical fixing jig includes: a vertical position adjusting pin to be inserted into a vertical position adjusting hole formed in the carrier for vertically fixing the carrier; and a drive unit for moving the vertical position adjusting pin.

It is preferable that the hood latch guide jig includes: a holding part for holding the hood latch assembly; and a drive part for moving the holding part.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

A hood latch assembling device for exactly positioning a hood latch assembly 100 at a carrier 200 includes a carrier assembling stand 300 for fixing the carrier 200, and a hood latch guide jig 301 for exactly positioning the hood latch assembly 100 at a predetermined location of the carrier 200.

Figure 1:
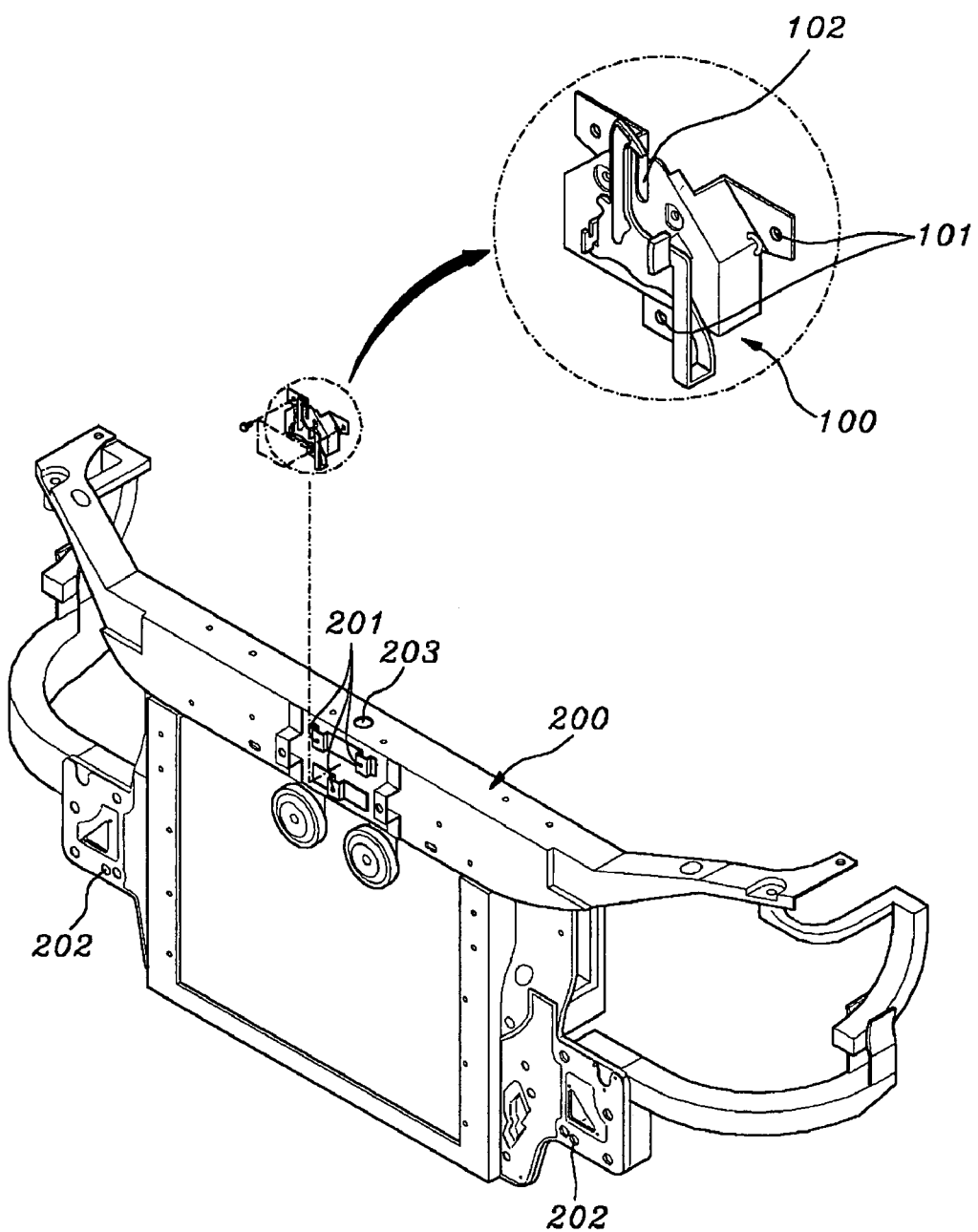
FIG. 1 is a perspective view of a hood latch assembly and a carrier of a hood latch assembling device according to a preferred embodiment of the present invention.
Figure 2:
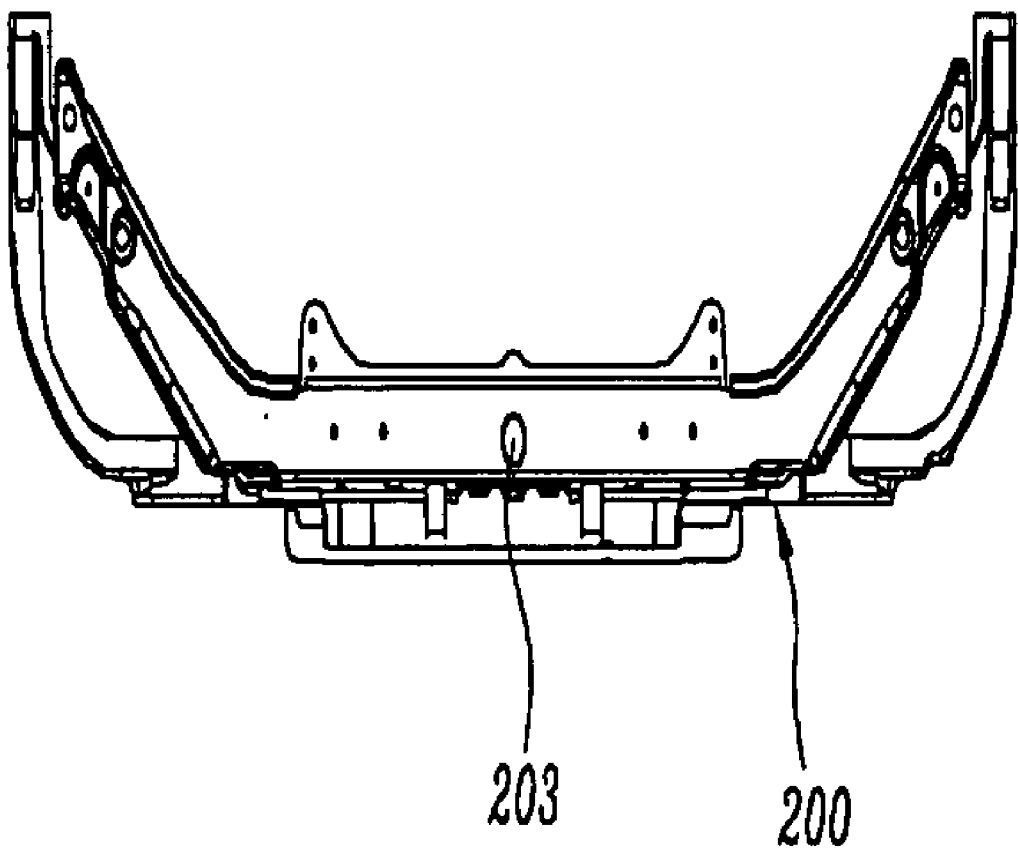
FIG. 2 is a plan view of the carrier of FIG. 1.

The hood latch assembly 100 is shown in FIG. 1, and the structure of the hood latch assembly 100 is the same as the description in the above "Background of the Related Art" part, and so, its detailed description will be omitted.

As shown in FIGS. 1 to 4, the carrier 200 includes vertical and horizontal position adjusting holes 203 and 202 formed in the upper surface and the front surface thereof, to insert vertical and horizontal position adjusting pins 303-1 and 304-1 thereto, respectively.

Moreover, the carrier 200 whose lower portion is fixed to a pallet (not shown) is carried onto a table 306 of the carrier assembling stand 300 by a conveyer belt.

Figure 3:
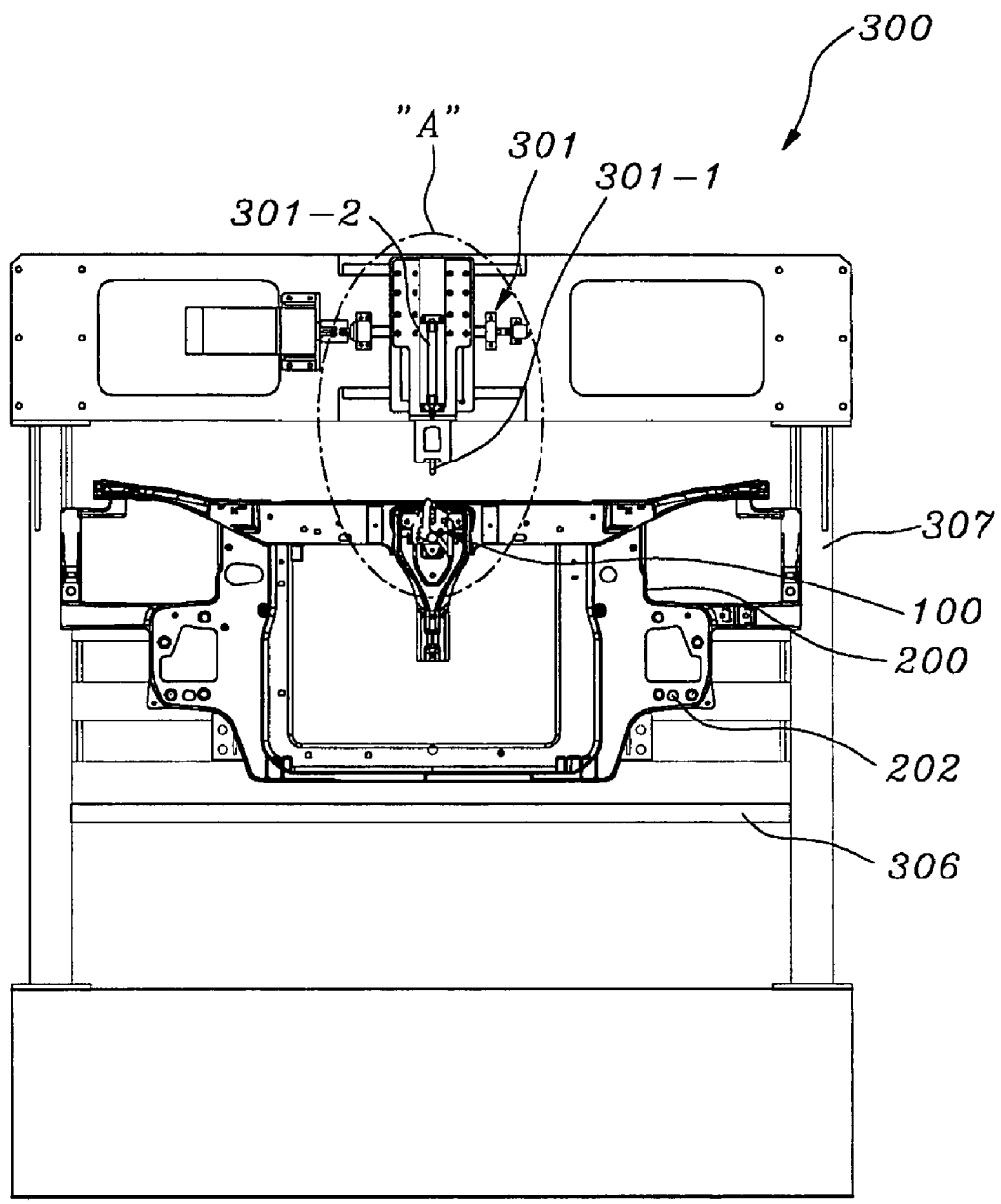
FIG. 3 is a front view of a carrier assembling stand and the carrier of the hood latch assembling device according to the present invention.
Figure 4:
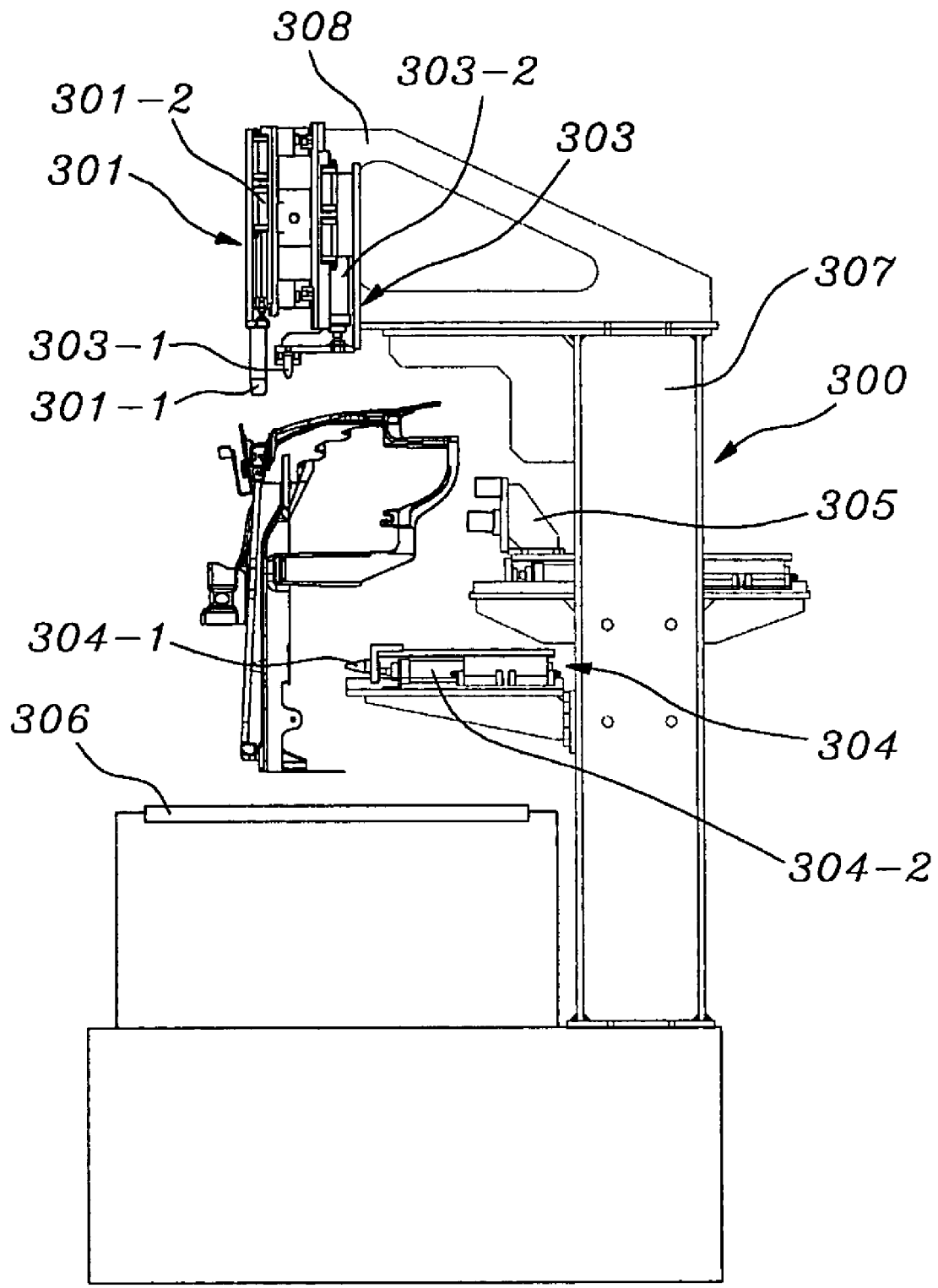
FIG. 4 is a side view of FIG. 3.

FIG. 3 is a front view of the carrier assembling stand 300 and the carrier 200 of the hood latch assembling device according to the present invention, and FIG. 4 is a side view of FIG. 3.

As shown in FIG. 3, the carrier assembling stand 300 includes a vertical frame 307 and a horizontal frame 308. The table 306 is mounted on the lower portion of the carrier assembling stand 300, and the pallet (not shown), which fixes the carrier 200, is located on the table 306.

As shown in FIG. 4, the carrier assembling stand 300 further includes a vertical fixing jig 303. The vertical fixing jig 303 is inserted into the vertical position adjusting hole 203 formed in the upper surface of the carrier 200 when the hood latch assembly 100 is assembled to the carrier 200, and includes a vertical position adjusting pin 303-1 for vertically fixing the carrier 200 and a drive unit 303-2 for driving the vertical position adjusting pin 303-1 vertically.

In addition, the carrier assembling stand 300 further includes horizontal fixing jigs 304. The horizontal fixing jigs 304 are inserted into the horizontal position adjusting holes 202 formed in both sides of the carrier 200 when the hood latch assembly 100 is assembled to the carrier 200, and each of the horizontal fixing jigs 304 includes a horizontal position adjusting pin 304-1 for horizontally fixing the carrier 200 and a drive unit 304-2 for driving the horizontal position adjusting pin 304-1 horizontally.

Figure 5:
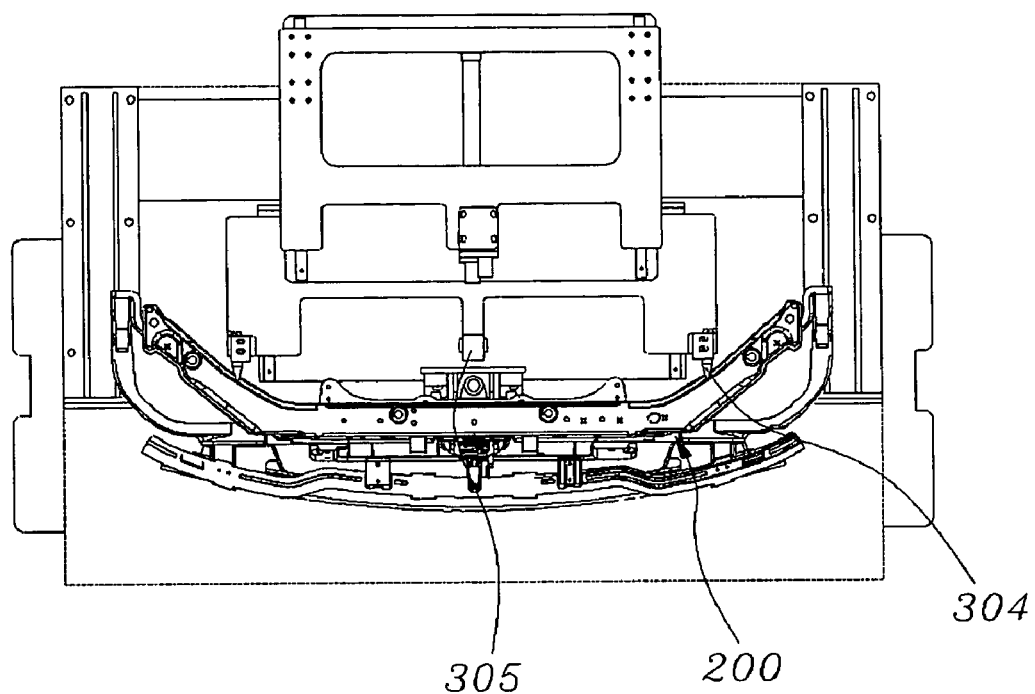
FIG. 5 is a plan view of FIG. 4.
Figure 6:
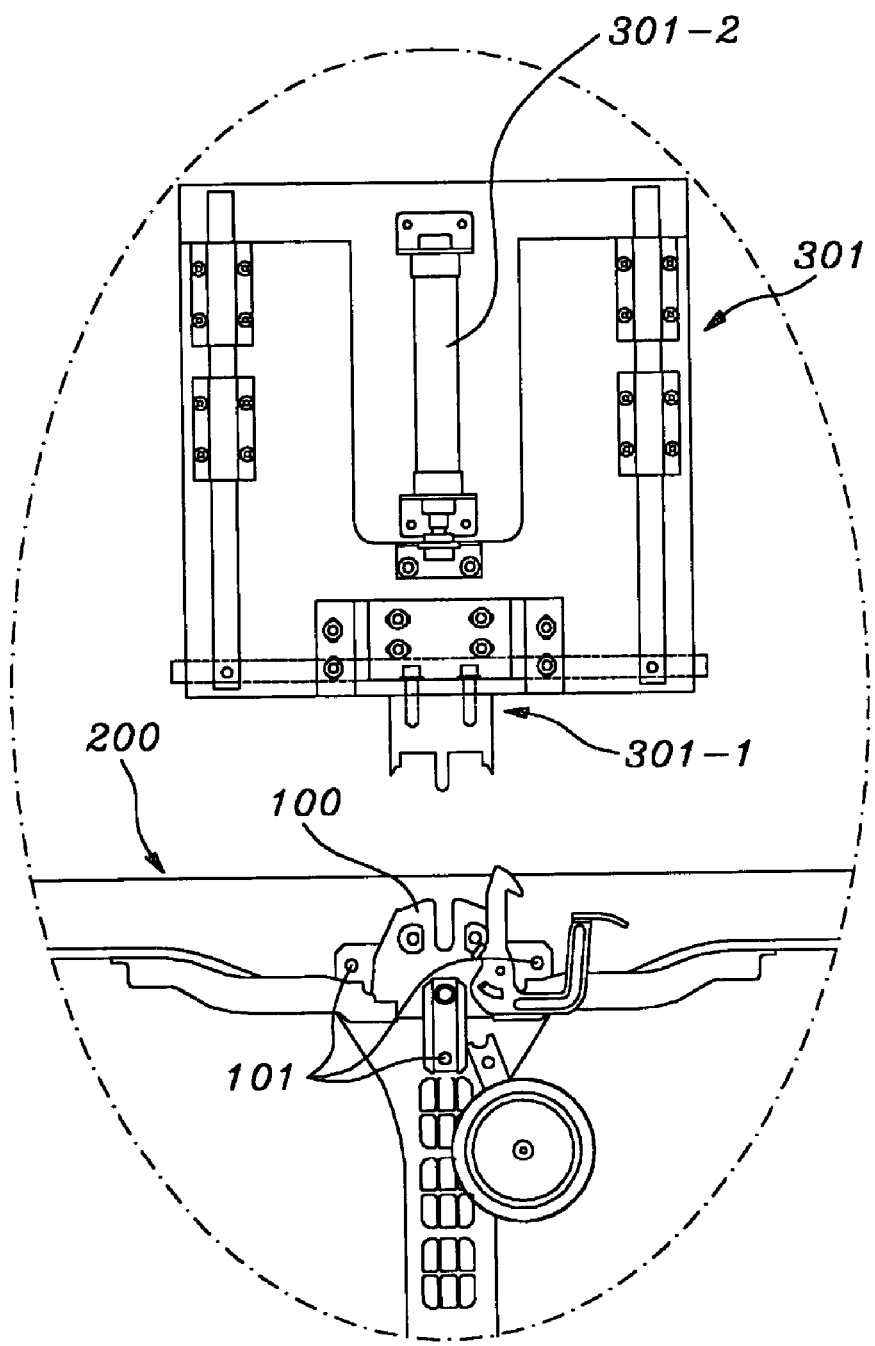
FIG. 6 is an enlarged view of an "A" part of FIG. 3.

Furthermore, as shown in FIGS. 4 to 6, the carrier assembling stand 300 has a hood latch guide jig 301 mounted on the upper portion thereof in front of the vertical fixing jig 303. The hood latch guide jig 301 includes a holding portion 301-1 for holding the hood latch assembly 100, and a drive part 301-2 for driving the holding portion 301-1 vertically.

Moreover, the hood latch guide jig 301 has a position sensor and a control unit (not shown) for controlling the hood latch assembly 100 to be positioned in the exact location of the carrier 200.

As shown in FIG. 5, the carrier assembling stand 300 has a horizontal supporting device 305 for preventing a horizontal movement of the carrier 200 by supporting the rear surface of the carrier 200 during the assembling process. The horizontal supporting device 305 has a horizontal drive unit (not shown). The horizontal supporting device 305 is moved horizontally during assembling the hood latch assembly 100 to the carrier 200, and then, supports the rear surface of the carrier 200.

An assembling process of the present invention will be described in detail as follows. First, after the carrier 200 is located on the table 306 of the carrier assembling stand 300, the vertical position adjusting pin 303-1 of the vertical fixing jig 303 is lowered in the vertical direction by the drive unit 303-2, and inserted into the vertical position adjusting hole 203 formed in the upper surface of the carrier 200 to fix the carrier 200. Meanwhile, the horizontal position adjusting pins 304-1 of the horizontal fixing jig 304 are moved in the horizontal direction (in the left direction of FIG. 4) by the drive units 304-2, and inserted into the horizontal position adjusting holes 202 formed in the both sides of the carrier 200 to fix the carrier 200.

At this time, the horizontal supporting device 305 is moved in the horizontal direction till contacting with the rear surface of the carrier 200 to support the carrier 200.

After that, in a state in which the hood latch assembly 100 is held into the holding part 301-1 of the hood latch guide jig 301, the holding part 301-1 is lowered to a predetermined location by the drive part 301-2, so that the hood latch assembly 100 is positioned at the exact location. At this time, the position sensor and the control unit mounted inside the hood latch guide jig 301 are controlled to locate the hood latch assembly 100 in the exact position, and the fixing holes of the hood latch assembly 100 and the fixing holes 201 of the carrier 200 are located in the corresponding positions.

After that, to complete the assembling process, fastening means, such as bolts, are fastened to the fixing holes 101 and 201.

As set forth above, the hood latch assembling device according to the present invention can reduce a time period required for an assembling process of the vehicle and lower an defective proportion as a position error of the hood latch is reduced by assembling the hood latch to an exact position of a carrier when a front end module is constructed.

In addition, when the carrier is mounted on the vehicle, as the hood latch is assembled with it being exactly fixed in left, right, upward and downward directions, the fixed part of the front hood and the fixing part of the hood latch assembly are prevent from being deviated from each other.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A hood latch assembling device for exactly positioning a hood latch assembly at a carrier, the hood latch assembling device comprising:
   a carrier assembling stand for fixing the carrier; and
   a hood latch guide jig for exactly positioning the hood latch assembly at a predetermined location of the carrier,
   the carrier assembling stand including:
   a vertical frame;
   a horizontal frame;
   horizontal fixing jigs for fixing and supporting the carrier on the vertical frame in the horizontal direction;
   a vertical fixing jig for fixing and supporting the carrier on the horizontal frame in the vertical direction;
   the hood latch guide jig being mounted at an end of the horizontal frame of the carrier assembling stand;
   the carrier assembling stand including a horizontal supporting device for preventing horizontal movement of the carrier by supporting the rear surface of the carrier while the hood latch assembly is assembled to the carrier.

2. A hood latch assembling device for exactly positioning a hood latch assembly at a carrier, the hood latch assembling device comprising:
   a carrier assembling stand for fixing the carrier; and
   a hood latch guide jig for exactly positioning the hood latch assembly at a predetermined location of the carrier,
   the carrier assembling stand including:
   a vertical frame;
   a horizontal frame;
   horizontal fixing jigs for fixing and supporting the carrier on the vertical frame in the horizontal direction;

a vertical fixing jig for fixing and supporting the carrier on the horizontal frame in the vertical direction;

the hood latch guide jig being mounted at an end of the horizontal frame of the carrier assembling stand;

the horizontal fixing jigs including a horizontal position adjusting pin adapted to be inserted into horizontal position adjusting holes in the carrier for horizontally fixing the carrier; and a drive unit for moving the horizontal position adjusting pin.

3. The hood latch assembling device according to claim 2, wherein the vertical fixing jig includes: a vertical position adjusting pin adapted to be inserted into a vertical position adjusting hole in the carrier for vertically fixing the carrier; and a drive unit for moving the vertical position adjusting pin.

4. The hood latch assembling device according to claim 3, wherein the hood latch guide jig includes: a holding part for holding the hood latch assembly; and a drive part for moving the holding part.

5. A hood latch assembling device for exactly positioning a hood latch assembly at a carrier, the hood latch assembling device comprising:

a carrier assembling stand for fixing the carrier; and a hood latch guide jig for exactly positioning the hood latch assembly at a predetermined location of the carrier, the carrier assembling stand including:

a vertical frame;

a horizontal frame;

horizontal fixing jigs for fixing and supporting the carrier on the vertical frame in the horizontal direction;

a vertical fixing jig for fixing and supporting the carrier on the horizontal frame in the vertical direction;

the hood latch guide jig being mounted at an end of the horizontal frame of the carrier assembling stand;

the vertical fixing jig including a vertical position adjusting pin adapted to be inserted into a vertical position adjusting hole in the carrier for vertically fixing the carrier; and a drive unit for moving the vertical position adjusting pin.

6. The device of claim 2, wherein the stand includes horizontal fixing jigs for fixing and supporting the carrier on the vertical frame in the horizontal direction;

a vertical fixing jig for fixing and supporting the carrier on the horizontal frame in the vertical direction;

the hood latch guide jig being mounted at an end of the horizontal frame of the carrier assembling stand;

the carrier assembling stand including a horizontal supporting device for preventing horizontal movement of the carrier by supporting the rear surface of the carrier while the hood latch assembly is assembled to the carrier.

7. The device of claim 3, wherein the stand includes horizontal fixing jigs for fixing and supporting the carrier on the vertical frame in the horizontal direction;

a vertical fixing jig for fixing and supporting the carrier on the horizontal frame in the vertical direction;

the hood latch guide jig being mounted at an end of the horizontal frame of the carrier assembling stand;

the carrier assembling stand including a horizontal supporting device for preventing horizontal movement of the carrier by supporting the rear surface of the carrier while the hood latch assembly is assembled to the carrier.

8. The device of claim 4, wherein the stand includes horizontal, fixing jigs for fixing and supporting the carrier on the vertical frame in the horizontal direction;

a vertical fixing jig for fixing and supporting the carrier on the horizontal frame in the vertical direction;

the hood latch guide jig being mounted at an end of the horizontal frame of the carrier assembling stand;

the carrier assembling stand including a horizontal supporting device for preventing horizontal movement of the carrier by supporting the rear surface of the carrier while the hood latch assembly is assembled to the carrier.

9. The device of claim 5, wherein the stand includes horizontal fixing jigs for fixing and supporting the carrier on the vertical frame in the horizontal direction;

a vertical fixing jig for fixing and supporting the carrier on the horizontal frame in the vertical direction;

the hood latch guide jig being mounted at an end of the horizontal frame of the carrier assembling stand;

the carrier assembling stand including a horizontal supporting device for preventing horizontal movement of the carrier by supporting the rear surface of the carrier while the hood latch assembly is assembled to the carrier.

* * * * *